(12) United States Patent
Matsuoka et al.

(10) Patent No.: US 9,663,034 B2
(45) Date of Patent: May 30, 2017

(54) VEHICLE ALARM OUTPUT APPARATUS FOR INTERSECTION OF ROADS

(71) Applicant: TOYOTA JIDOSHA KABUSHIKI KAISHA, Toyota-shi, Aichi-ken (JP)

(72) Inventors: Katsuhiro Matsuoka, Nagakute (JP); Kazuhiro Morimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/858,401

(22) Filed: Sep. 18, 2015

(65) Prior Publication Data

US 2016/0101731 A1 Apr. 14, 2016

(30) Foreign Application Priority Data

Oct. 14, 2014 (JP) .................................. 2014-210236

(51) Int. Cl.
| | |
|---|---|
| G08B 21/00 | (2006.01) |
| B60Q 9/00 | (2006.01) |
| G08G 1/16 | (2006.01) |
| G08G 1/0967 | (2006.01) |

(52) U.S. Cl.
CPC ....... *B60Q 9/008* (2013.01); *G08G 1/096716* (2013.01); *G08G 1/096758* (2013.01); *G08G 1/096783* (2013.01); *G08G 1/163* (2013.01); *G08G 1/166* (2013.01)

(58) Field of Classification Search
CPC ......... B60Q 9/008; G08G 1/161; G08G 1/166

USPC ......................................................... 340/435
See application file for complete search history.

(56) References Cited

U.S. PATENT DOCUMENTS

| | | | | |
|---|---|---|---|---|
| 5,754,099 | A * | 5/1998 | Nishimura | ................ B60T 7/22 340/435 |
| 6,360,171 | B1 | 3/2002 | Miyamoto et al. | |
| 6,459,991 | B1 | 10/2002 | Takiguchi et al. | |
| 6,647,268 | B1 | 11/2003 | Tsuchida et al. | |
| 2004/0181339 | A1* | 9/2004 | Mukaiyama | ....... B60K 31/0008 701/301 |

(Continued)

FOREIGN PATENT DOCUMENTS

| | | |
|---|---|---|
| DE | 10 2008 034 229 A1 | 4/2009 |
| EP | 1 096 458 A2 | 5/2001 |

(Continued)

*Primary Examiner* — Mark Rushing
(74) *Attorney, Agent, or Firm* — Oliff PLC (57) ABSTRACT

There is provided an vehicle alarm output apparatus comprising: a waiting state determining unit configured to determine whether an own vehicle is in a waiting state; a start determining unit configured to determine whether the own vehicle starts to travel; an other vehicle information acquiring unit configured to acquire other vehicle information related to another vehicle; an arrival time calculating unit configured to calculate a time taken for the other vehicle to reach a front end of the own vehicle; and an output unit configured to output a certain alarm upon determining the own vehicle to be in the waiting state, the own vehicle to start, and the time to be equal to or less than a first threshold value; wherein the output unit is prevented from outputting the certain alarm upon detecting the time to be equal to or less than a second threshold value.

3 Claims, 8 Drawing Sheets

(56) References Cited

U.S. PATENT DOCUMENTS

2004/0210364 A1\* 10/2004 Kudo .................. G08G 1/167
                                                              701/36
2005/0143889 A1    6/2005 Isaji et al.
2007/0276600 A1\* 11/2007 King .................... G08G 1/042
                                                              701/301

FOREIGN PATENT DOCUMENTS

| JP | 2001-126199 A | 5/2001 |
| JP | 3565412 B2 | 9/2004 |
| JP | 2005-189983 A | 7/2005 |
| JP | 2010-076562 A | 4/2010 |
| JP | 2010-211528 A | 9/2010 |
| JP | 2014-149741 A | 8/2014 |

\* cited by examiner

VEHICLE ALARM OUTPUT APPARATUS FOR INTERSECTION OF ROADS

BACKGROUND OF THE INVENTION

1. Field of the Invention

The present disclosure is related to a vehicle alarm output apparatus.

2. Description of the Related Art

A collision in right/left turn prevention system is known, which determines the collision risk in right turn based on oncoming vehicle information, road line form information and own vehicle information, and thereby provides a driver with the risk information (for example, see Patent Document 1).

A driving support apparatus is known, which generates an alarm in a case where an approaching vehicle is detected upon the own vehicle entering into an intersection area and an accelerator pedal starting to be operated, thereby preventing a collision between the own vehicle and the approaching vehicle (for example, see Patent Document 2).

By the way, in order to make a right turn avoiding a collision, the driver may quickly start the own vehicle recognizing another vehicle (for example, an oncoming vehicle when waiting to make a right turn) with which the own vehicle is likely to collide in a case where the own vehicle has waited for timing to start the right turn or the own vehicle is entering into the intersection area. In such case, the alarm is unlikely to be required. The reason is that the driver starts the own vehicle while recognizing the other vehicle, and that the vehicles may not collide even if the driver quickly starts the own vehicle in a case where time taken for the other vehicle to reach a front end of the own vehicle in a travelling direction of the other vehicle is long enough.

RELATED ART DOCUMENT

Patent Document

[Patent Document 1] Japanese Laid-open Patent Publication No. 2001-126199
[Patent Document 2] Japanese Laid-open Patent Publication No. 2010-076562

SUMMARY OF THE INVENTION

An object of the present disclosure is to provide a vehicle alarm output apparatus capable of reducing unnecessary alarms when starting a vehicle in an intersection.

The following configuration is adopted to achieve the aforementioned object.

In one aspect of the embodiment, there is provided a vehicle alarm output apparatus configured to output an alarm at an intersection of roads, the alarm output apparatus comprising: a waiting state determining unit configured to determine whether an own vehicle is in a waiting state, wherein the waiting state is a state where the own vehicle within an intersection area including the intersection is waiting for a timing to turn left or right to travel across an opposite lane, or the own vehicle before the intersection area is waiting for a timing to enter the intersection area; a start determining unit configured to determine whether the own vehicle starts to travel; an other vehicle information acquiring unit configured to acquire other vehicle information related to another vehicle travelling toward the intersection; an arrival time calculating unit configured to calculate, based on the other vehicle information acquired by the other vehicle information acquiring unit, a time taken for the other vehicle to reach a position corresponding to a front end of the own vehicle in a travelling direction of the other vehicle upon the waiting state determining unit determining the own vehicle to be in the waiting state; and an output unit configured to output a certain alarm upon the waiting state determining unit determining the own vehicle to be in the waiting state, the start determining unit determining the own vehicle to start to travel, and the time calculated by the arrival time calculating unit to be equal to or less than a first threshold value; wherein the output unit is prevented from outputting the certain alarm upon detecting the time calculated by the arrival time calculating unit to be equal to or less than a second threshold value which is less than the first threshold value.

Other objects, features and advantages of the present invention will become more apparent from the following detailed description when read in conjunction with the accompanying drawings.

DETAILED DESCRIPTION OF THE PREFERRED EMBODIMENTS

In the following, embodiments are described in detail with reference to appended drawings.

Figure 1:
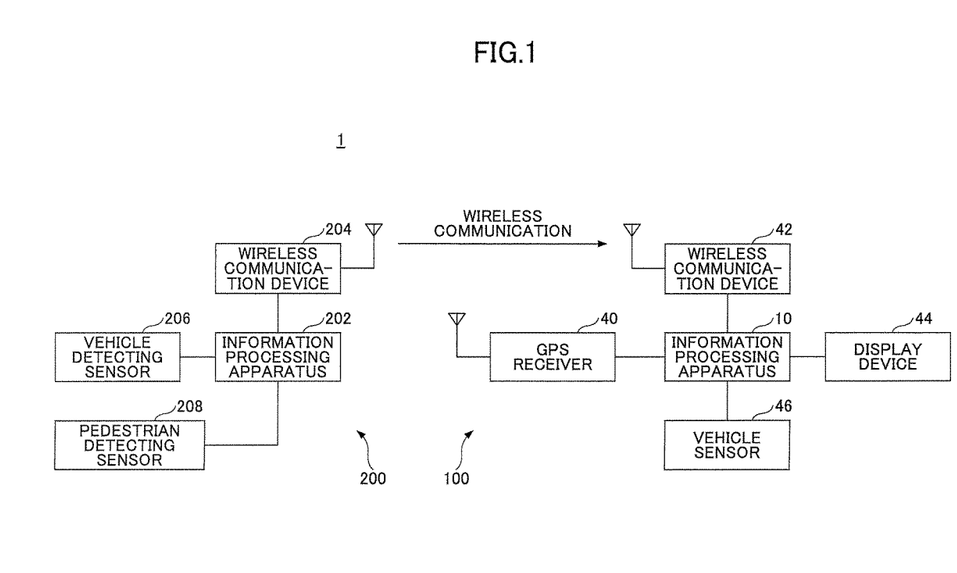
FIG. 1 is a block diagram for illustrating an example configuration of a road-vehicle communication system to which a vehicle alarm output apparatus is applied.

FIG. 1 is a block diagram for illustrating an example configuration of road-vehicle communication system 1 of the embodiment 1 to which a vehicle alarm output apparatus is applied.

The road-vehicle communication system 1 includes an onboard apparatus 100 and an on-road monitoring apparatus 200.

The onboard apparatus 100 is installed in a vehicle. In the following, the vehicle in which the onboard apparatus 100 is installed may be referred to as "own vehicle".

The onboard apparatus 100 includes an information processing apparatus (an example of the vehicle alarm output apparatus) 10, a GPS (Global Positioning System) receiver 40, a wireless communication device (an example of a receiving unit) 42, a display device 44 and a vehicle sensor 46.

The information processing apparatus 10 is formed with a computer. Respective functions (including functions described below) of the information processing apparatus 10 may be achieved by arbitrary hardware, software, firmware or a combination thereof. Also, the information processing apparatus 10 may be achieved by a plurality of information processing apparatuses.

The GPS receiver 40 calculates an own vehicle position (for example, latitude, longitude, and direction) based on signals from satellites.

The wireless communication device 42 performs wireless communication with the wireless communication device 204 included in the on-road monitoring apparatus 200.

The display device 44 outputs a certain alarm and the like, under control of the information processing apparatus 10.

The vehicle sensor 46 may include a wheel speed sensor, a brake sensor, a blinker switch (a kind of sensor) for detecting an operation state of a blinker lever, a steering angle sensor and the like. For example, the brake sensor may be a sensor for detecting master cylinder pressure, wheel cylinder pressure or the like.

The on-road monitoring apparatus 200 is disposed on an area including an intersection of roads. Hereinafter, the intersection means an area of intersection of roads where the on-road monitoring apparatus 200 is disposed unless otherwise mentioned.

The on-road monitoring apparatus 200 includes an information processing apparatus 202, a wireless communication device 204, a vehicle detecting sensor 206 and a pedestrian detecting sensor 208.

The information processing apparatus 202 is formed with a computer. The information processing apparatus 202 generates object information based on the respective detection results of the vehicle detecting sensor 206 and the pedestrian detecting sensor 208 to provide it to the onboard apparatus 100. The object information may be arbitrarily generated as long as it indicates the respective detection results of the vehicle detecting sensor 206 and the pedestrian detecting sensor 208. The information processing apparatus 202 sends (broadcasts) the object information to the onboard apparatuses 100 through the wireless communication device 204. For example, the information processing apparatus 202 sends the object information with periodic updates to it since the object information is dynamically changed.

The information processing apparatus 202 may also generates information of the traffic signal in the intersection, the traffic regulation of the intersection and the road shape in the intersection, etc., (hereinafter these are referred to as intersection information) and may send (broadcasts) the generated intersection information to the onboard apparatuses 100 through the wireless communication device 204.

The wireless communication device 204 sends the object information, etc., to the wireless communication device 42 included in the onboard apparatus 100.

The vehicle detecting sensor 206 detects a state of a vehicle travelling toward the center of the intersection. For example, the detection result of the vehicle detecting sensor 206 includes a presence of the vehicle, position and speed of the vehicle. For example, the position of the vehicle may be a distance between an end (one end closer to the center of the intersection) of a detection area of the vehicle detecting sensor 206 and the vehicle. The vehicle detecting sensor 206 may be a radar sensor, an image sensor or the like.

The pedestrian sensor 208 detects a pedestrian using a pedestrian crossing in the intersection. For example, the detection result of the pedestrian detecting sensor 208 may be a presence of the pedestrian, a position of the pedestrian, and the like. The pedestrian detecting sensor 208 may be a radar sensor, an image sensor or the like.

Figure 2:
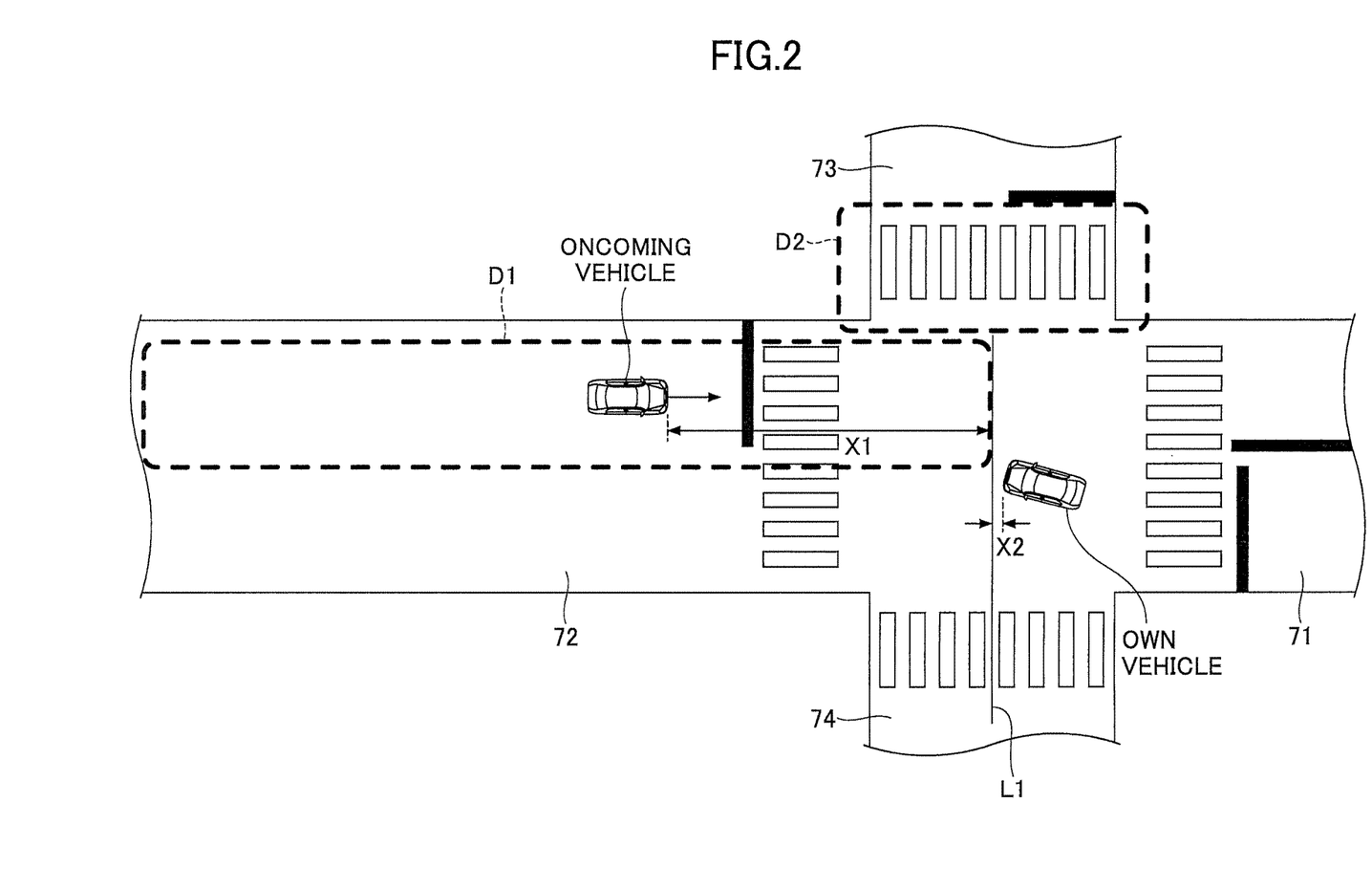
FIG. 2 is a diagram for illustrating an example of a detection area of a vehicle detecting sensor and a pedestrian detecting sensor.

FIG. 2 is a plane view for illustrating an example of the detection area of the vehicle detecting sensor 206 and the pedestrian detecting sensor 208 for an intersection. In the following, the description is given assuming that the own vehicle is at a position shown in FIG. 2, and terms "oncoming vehicle" and "opposite lane" are used for another vehicle and a traffic lane with respect to the own vehicle.

The vehicle detecting sensor 206 and the pedestrian detecting sensor 208 are separately disposed corresponding to the direction along which the vehicles can make right turns. For example, in the intersection shown in FIG. 2, the vehicle can make a right turn along four directions that are from a road 71 to a road 73, from a road 72 to a road 74, from the road 73 to the road 72, and the road 74 to the road 71. Thus, four pairs of the vehicle detecting sensor 206 and the pedestrian detecting sensor 208 are disposed in the intersection.

In the example shown in FIG. 2, the detection area D1 of the vehicle detecting sensor 206 and the detection area D2 of the pedestrian detecting sensor 208 respectively provided for the right turn from the road 71 to the road 73 are schematically shown. The detection area D1 of the vehicle detecting sensor 206 covers the opposite lane in the road 72 up to the center line L1 of the intersection. For example, the center line L1 may correspond to an end of detection area of the vehicle detecting sensor 206. The length of the detection area D1 may be arbitrary, for example, it may be approximate 150 m. The detection area D2 of the pedestrian detecting sensor 208 covers the pedestrian crossing on which the vehicle passes when making the right turn from the road 71 to the road 73. As shown in FIG. 2, the detection area D2 may cover the entire pedestrian crossing including the vicinity thereof.

Figure 3:
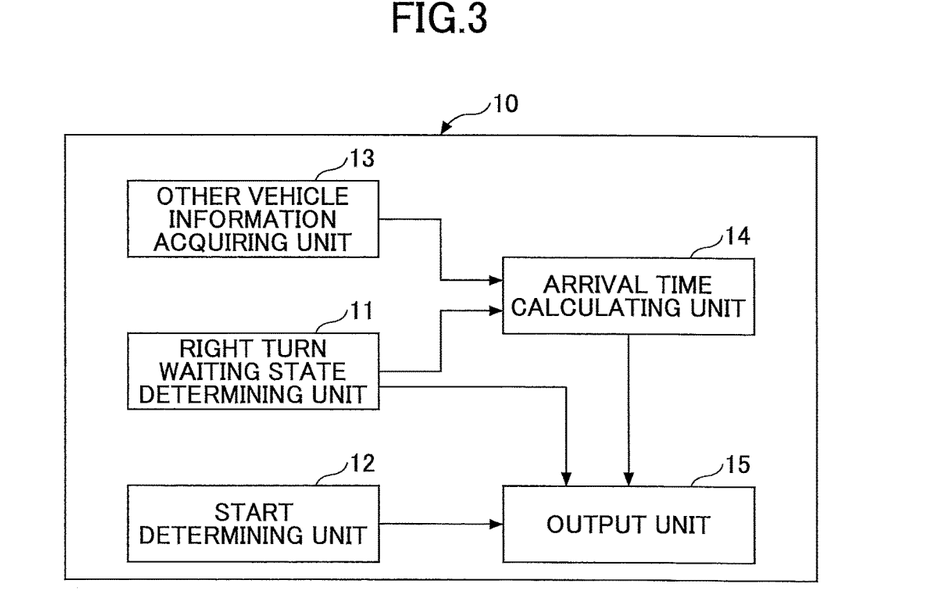
FIG. 3 is a block diagram for illustrating an example functional configuration of an information processing apparatus.

FIG. 3 is a block diagram for illustrating an example functional configuration of the information processing apparatus 10.

The information processing apparatus 10 includes a right turn waiting state determining unit (an example of waiting state determining unit) 11, a start determining unit 12, an other vehicle information acquiring unit 13, an arrival time calculating unit 14 and an output unit 15. The right turn waiting state determining unit 11, the start determining unit 12, the other vehicle information acquiring unit 13, the arrival time calculating unit 14 and the output unit 15 are respectively achieved by executing programs with the CPU of a computer. Additionally, the right turn waiting state determining unit 11, the start determining unit 12, the other vehicle information acquiring unit 13, the arrival time calculating unit 14 and the output unit 15 are virtually separated. For example, a program for achieving the right turn waiting state determining unit 11 may include all or a part of a program for achieving the output unit 15, while the program for achieving the output unit 15 may include all or a part of a program for achieving the arrival time calculating unit 14.

The right turn waiting state determining unit 11 determines whether the own vehicle is in a right turn waiting state (an example of a waiting state) in the intersection. The right turn waiting state determining unit 11 sets a right turn waiting state flag to be "1" upon the own vehicle being determined to be in the right turn waiting state in the intersection, while setting it to be "0" in other cases. The determination method may be arbitrarily chosen. For example, the right turn waiting state determining unit 11 may determine the own vehicle to be in the right turn waiting state in the intersection when all of the following conditions (1)-(4) are satisfied.

(1) The position of own vehicle approximately corresponds to the center of the intersection.
(2) The right blinker is blinking.
(3) The brake pedal is being operated.
(4) The own vehicle is stopped.

In this case, for example, right turn waiting state determining unit 11 may determine whether the position of the own vehicle reported from the GPS receiver 40 approximately corresponds to the center of the intersection defined base on map data (or defined based on the intersection information provided from the on-road monitoring apparatus 200). Since the position for waiting for timing to make a right turn is not always coincident with the center point of the intersection, the right turn waiting state determining unit 11 determines whether the position approximately corresponds to the center of the intersection. Also, the right turn waiting state determining unit 11 may determine whether the right blinker is blinking based on information provided from the blinker switch. Further, the right turn waiting state determining unit 11 may determine whether the brake pedal is operated based on information indicating that a brake lamp is lit/extinguished. Also, the right turn waiting state determining unit 11 may determine whether the own vehicle is stopped based on information provided from the wheel speed sensor. Additionally, conditions (1)-(4) are given as examples. One or more of the conditions may be omitted while one or more conditions may be added. For example, the added condition may be;

(5) the own vehicle is on a right turn lane and the vehicle is allowed to make a right turn in the intersection according to the traffic regulation, and the like.

The start determining unit 12 determines whether the own vehicle starts (to travel). The start determining unit 12 sets a start state flag to be "1" upon the own vehicle being determined to be started, while set it to be "0" in other cases. The start state flag may be kept to be "1" for a predetermined period (for example 2 seconds) after the start determining unit 12 sets the start state flag to be "1". The determination method may be arbitrarily chosen. For example, the start determining unit 12 may determine whether the brake pedal operation is released while the vehicle speed is "0", and the own vehicle may be determined to be started in a case where the brake pedal operation is released. In this case, for example, the start determining unit 12 may determine whether the brake pedal operation is released based on information indicating that a brake lamp is lit/extinguished. Additionally, the condition of releasing the brake pedal operation is an example, and one or more conditions may be added as logical AND conditions. For example, the added condition may be that the accelerator pedal is operated, the speed of the vehicle is increased from "0", or the like.

The other vehicle information acquiring unit 13 acquires the object information (an example of other vehicle information) from the on-road monitoring apparatus 200 through the wireless communication device 42. As described above, since the object information is dynamically changed, preferably, the other vehicle information acquiring unit 13 acquires (updates) the latest object information unless a communication failure, etc. occurs. Also, as described above, the object information includes information indicating the detection result of the vehicle detecting sensor 206, that is, information indicating the state of the vehicle in the detection area D1.

The arrival time calculating unit 14 calculates, based on the object information acquired by the other vehicle information acquiring unit 13, time (herein after referred to as "arrival time $\Delta T1$") to be taken for the oncoming vehicle in the detection area D1 to reach a position corresponding to front end of the own vehicle in the travelling direction of the oncoming vehicle. Since the arrival time $\Delta T1$ changes dynamically, preferably, the arrival time calculating unit 14 calculates (updates) the arrival time $\Delta T1$ based on the latest object information in every predetermined period.

To be exact, the front end of the own vehicle in the travelling direction of the oncoming vehicle in the detection area D1 (hereinafter referred to as "reference position") means the position at which a line extending from the front end of the own vehicle perpendicularly to the opposite lane and a line extending along the travelling direction of the oncoming vehicle (or direction along the opposite line) intersect each other. However, the reference position in the actual control may not be so exact. For example, it may be simply defined to be a position corresponding to the center line L1 of the intersection (for example, a center point of the intersection defined in the intersection information) or a position corresponding to a stop line in the right turn lane. For example, the arrival time calculating unit 14 calculates the arrival time $\Delta T1$ by dividing the distance X1 (for example, distance between the center line L1 of the intersection and the oncoming vehicle) to the oncoming vehicle based on the object information, by a speed of the oncoming vehicle based on the object information. Or, the arrival time calculating unit 14 may calculate a distance X2 (may be a negative value in a case where the front end of the own vehicle exceeds the center line L1 of the intersection) between the front end of the own vehicle and the center line L1 of the intersection, and thereby calculates the arrival time $\Delta T1$ by dividing a distance found by adding the distance X1 and the distance X2 (=X1+X2) by a speed of the oncoming vehicle based on the object information. In this case, the arrival time calculating unit 14 can calculate the distance X2 based on the position of the own vehicle provided from the GPS receiver 40 and the center of the intersection defined based on the map data (or the center point of the intersection defined based on the intersection information provided from the on-road monitoring apparatus 200).

The output unit 15 outputs a certain alarm in a case where the right turn waiting state determining unit 11 determines the own vehicle to be in the right turn waiting state, the start determining unit 12 determines the own vehicle to start, and the arrival time calculating unit 14 calculates the arrival time $\Delta T1$ to be equal to or less than a first threshold value Th1, while a prohibition condition is not met.

The prohibition condition is met when the following condition (a) is met.

Condition (a): the arrival time $\Delta T1$ is equal to or less than a second threshold value Th2 which is less than the first threshold value Th1.

The first threshold value may be an adaptive value, which corresponds to the maximum value in a range within which the calculated arrival time $\Delta T1$ exists, whereas the calculated arrival time $\Delta T1$ implies a collision with the oncoming vehicle in making a right turn. Since the range, within which the calculated arrival time $\Delta T1$ of the oncoming vehicle that may collide with the own vehicle exists, depends on a width of the opposite lane and the like, the first threshold Th1 may be variable according to the width of the opposite lane and the like. The second threshold value Th2 is less than the first threshold value Th1. Also, preferably, the second threshold value Th2 is greater than "0".

Figure 4:
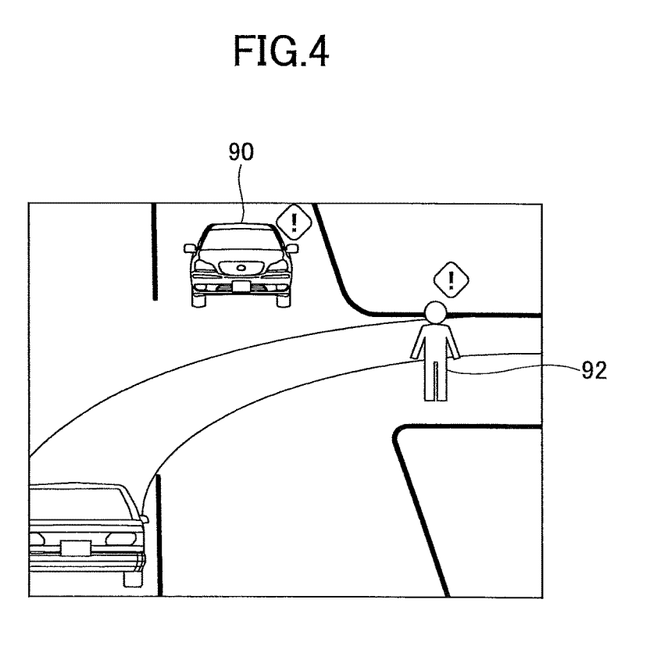
FIG. 4 is a diagram for illustrating an example manner in which a certain alarm is output.

The certain alarm is for calling attention of the driver to the oncoming vehicle. FIG. 4 is a diagram for illustrating an example manner in which the certain alarm is output. In FIG. 4, there is an example screen of the display device 44 in a case where the certain alarm is displayed. In the example shown in FIG. 4, the certain alarm includes a displayed alarm 90 for indicating the oncoming vehicle and a displayed alarm 92 for indicating the pedestrian.

Figure 5:
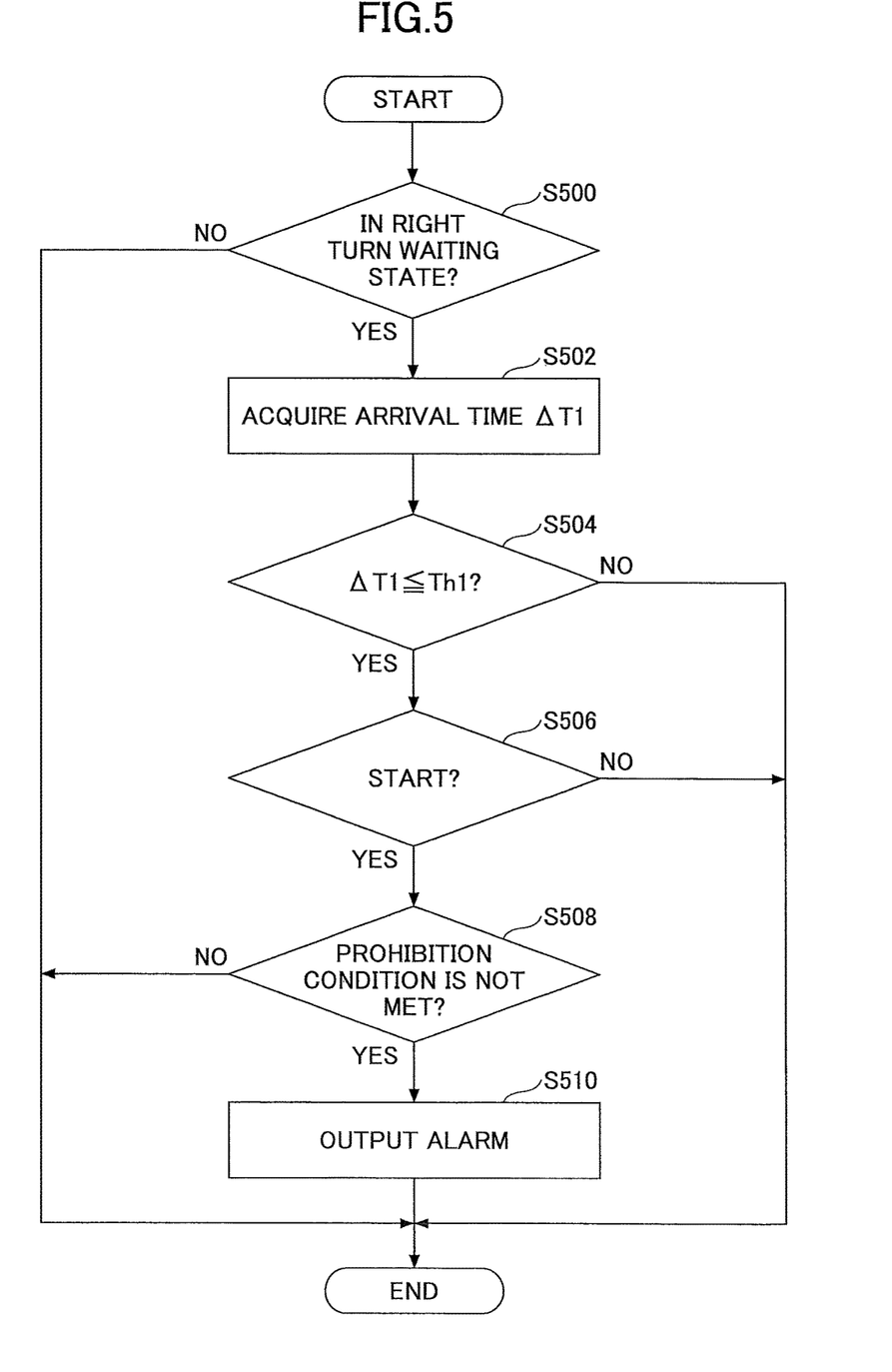
FIG. 5 is a flowchart for illustrating an example of an alarm output process performed by an output unit.

FIG. 5 is a flowchart for illustrating an example of an alarm output process performed by the output unit 15.

In step S500, the output unit 15 determines whether the right turn waiting state determining unit 11 determines the own vehicle to be in the right turn waiting state in the intersection. Specifically, the output unit 15 determines whether the right turn waiting state flag is "1". The process proceeds to step S502 in a case where the right turn waiting state flag is "1", while the process (in this cycle) ends in a case where the right turn waiting state flag is not "1".

In step S502, the output unit 15 acquires the latest arrival time $\Delta T1$ calculated by the other vehicle information acquiring unit 13.

In step S504, the output unit 15 determines whether the arrival time $\Delta T1$ is equal to or less than the first threshold value Th1 acquired in step S502. The process proceeds to step S506 in a case where the arrival time $\Delta T1$ is equal to or less than the first threshold value Th1, while the process (in this cycle) ends in a case where the arrival time $\Delta T1$ is not equal to or less than the first threshold value Th1.

In step S506, the output unit 15 determines whether the start determining unit 12 determines the own vehicle to start. Specifically, the output unit 15 determines whether the start state flag is "1". The process proceeds to step S508 in a case where the start state flag is "1", while the process (in this cycle) ends in a case where the start state flag is not "1".

In step S508, the output unit 15 determines whether the prohibition condition is not met. As described above, the prohibition condition is met when the conditions (a); "the arrival time $\Delta T1$ is equal to or less than a second threshold value Th2 which is less than the first threshold value Th1"; is met. The prohibition condition may include one or more conditions as logical AND conditions or logical OR conditions in addition to the condition (a). For example, condition (d) described below may be included as the logical OR condition.

Condition (d): reliability of the object information used for calculating the arrival time $\Delta T1$ is low.

The condition (d) may be met in a case where the object information has not been updated for a time equal to or greater than a predetermined period.

In Step S510, the output unit 15 outputs the certain alarm.

According to the process shown in FIG. 5, the output unit 15 outputs the certain alarm in a case where the right turn waiting state determining unit 11 determines the own vehicle to be in the right turn waiting state, the start determining unit 12 determines the own vehicle to start, and the arrival time calculating unit 14 calculates the arrival time $\Delta T1$ to be equal to or less than a first threshold value Th1, while the prohibition condition is not met. Thus, in a case where the prohibition condition is not met, the alarm against the driver of the own vehicle can be output according to the state of the oncoming vehicle when the own vehicle is transitioning from a right turn waiting state to a starting state (when the own vehicle is starting the right turn). That is, when the arrival time $\Delta T1$ calculated by the arrival time calculating unit 14 implies a collision with the oncoming vehicle in the right turn, the attention of the driver of the own vehicle can be called by the alarm.

Also, according to the process shown in FIG. 5, the output unit 15 is prevented from outputting the certain alarm as long as the prohibition condition is met; even if the right turn waiting state determining unit 11 determines the own vehicle to be in the right turn waiting state, the start determining unit 12 determines the own vehicle to start, and the arrival time calculating unit 14 calculates the arrival time $\Delta T1$ to be equal to or less than a first threshold value Th1. That is, according to the process shown in FIG. 5, the output unit 15 is prevented from outputting the certain alarm as long as the arrival time $\Delta T1$ is equal or less than the second threshold value Th2; even if the right turn waiting state determining unit 11 determines the own vehicle to be in the right turn waiting state, the start determining unit 12 determines the own vehicle to start, and the arrival time calculating unit 14 calculates the arrival time $\Delta T1$ to be equal to or less than a first threshold value Th1.

Generally, the collision risk becomes greater as the arrival time $\Delta T1$ becomes smaller in the case of a head-on collision. However, the collision risk does not always become greater as the arrival time $\Delta T1$ becomes smaller in the case of a collision between a vehicle (in this example, the own vehicle) waiting to make a right turn and the oncoming vehicle since there is an offset of vehicle width direction in between the own vehicle and the oncoming vehicle. Specifically, even if the state of the own vehicle is transitioned from the right turn waiting state to the starting state while the arrival time $\Delta T1$ is small, the oncoming vehicle may have passed by the position (center line L1 of the intersection) corresponding to the front end of the own vehicle before the own vehicle starts to cross the opposite lane. That is, even though the arrival time $\Delta T1$ is small, the oncoming vehicle may not collide with the own vehicle, which has been waiting to make a right turn and just starts to make it. In such case, the output of the certain alarm is not required and it may cause the driver to be irritated.

According to the process shown in FIG. 5, the output of the certain alarm is prohibited in a case where the arrival time $\Delta T1$ is equal to or less than the second threshold value Th2. Thus, occurrence of unnecessary alarm can be reduced in starting the own vehicle having been waiting to make a right turn. As a consequence, likelihood for having the driver be irritated caused by the unnecessary alarm can be reduced.

Additionally, the second threshold value Th2 may be arbitrarily chosen as long as it is less than the first threshold value. For example, the second threshold value Th2 may be set corresponding to the maximum value of a visible range of the driver of the own vehicle. The reason is that the output of the alarm is unlikely to be required as long as the driver of the own vehicle recognizes the oncoming vehicle. Or, the second threshold value Th2 may be set to be less than a time (hereinafter referred to as virtual collision point arrival time) taken for the own vehicle having waited for the right turn and just starting it to reach a position in the opposite lane where collision with the oncoming vehicle can occur. This method will be applied in view of preventing the collision regardless of the driver's recognition of the oncoming vehicle. The second threshold value Th2 may be an adaptive value since the virtual collision point arrival time depends on a state of the intersection (for example, number of lanes or road width), acceleration performance of the own vehicle (for example, creep torque or inclination of road), or the like. Further, the second threshold value Th2 may be set for every intersection and may be included in the intersection information, for example. In this case, the output unit 15 of the information processing apparatus 10 may determine whether the prohibition condition is met based on the intersection information received from the on-road monitoring apparatus 200.

Additionally, in the example shown in FIG. 5, although the respective processes are performed in a certain sequence, the sequence of processes may be changed. For example, the determination of step S506 may be performed before step S504.

Also, in the embodiment 1 described above, although the prohibition condition is met when the condition (a); "the arrival time ΔT1 is equal to or less than a second threshold value Th2 which is less than the first threshold value Th1"; is met, one or more conditions (logical AND conditions) may be added to the condition (a). For example, the prohibition condition is met when the condition (a) and condition (b) described below are satisfied.

Condition (b): no pedestrian is on the pedestrian crossing in right turn direction.

In this case, the output unit 15 may determine whether the condition (b) is met based on the object information (detection result of pedestrian detecting sensor 208) acquired by the other vehicle information acquiring unit 13. This variation is preferable in a case where the certain alarm includes the displayed alarm 90 for indicating the oncoming vehicle and the displayed alarm 92 for indicating the pedestrian, as shown in FIG. 4. In other words, the condition (b) may be omitted in a case where the certain alarm only includes the displayed alarm 90, without including the displayed alarm 92.

Also, the prohibition condition may be met when the condition (a) and condition (c) described below are satisfied.

Condition (c): the arrival time ΔT1 of another oncoming vehicle which follows the oncoming vehicle, while whether the prohibition condition is met is being determined with respect to the oncoming vehicle, is not equal to or less than the first threshold value Th1.

In the following, the vehicle alarm output apparatus of the embodiment 2 will be described with reference to FIG. 6 and FIG. 7.

Figure 6:
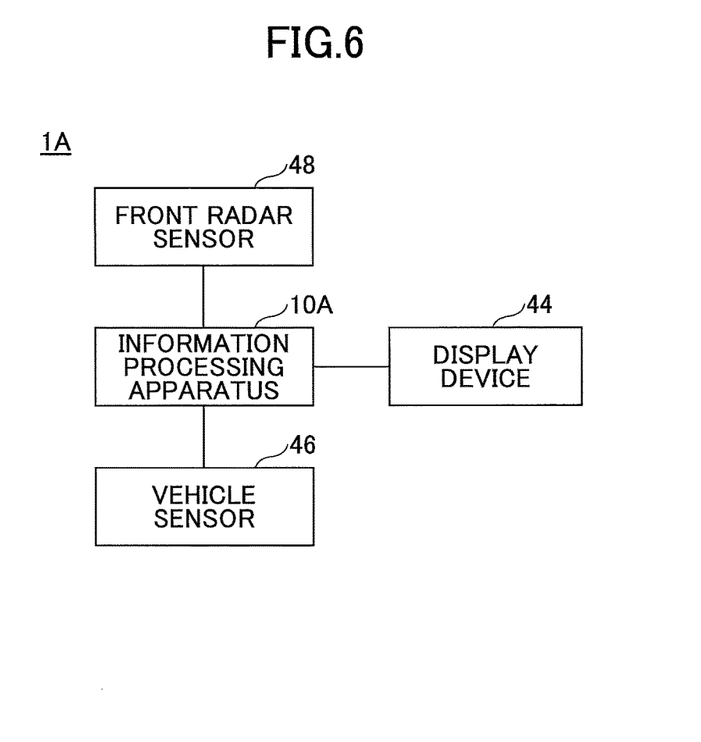
FIG. 6 is a block diagram for illustrating an example system configuration of a vehicle system to which the vehicle alarm output apparatus of the embodiment 2 is applied.

FIG. 6 is a block diagram for illustrating an example system configuration of a vehicle system 1A to which the vehicle alarm output apparatus of the embodiment 2 is applied. As for the vehicle system 1A, identical reference numerals will be applied to elements or the like shown in FIG. 6 that have substantially similar functions and configurations to those shown in FIG. 1, and descriptions thereof will be omitted.

The vehicle system 1A includes an information processing apparatus 10A, the display device 44, the vehicle sensor 46 and a front radar sensor 48.

The front radar sensor 48 detects a state (preceding vehicle information) of a preceding vehicle in front direction of the vehicle by using radio waves (for example, millimeter wave), optical waves (for example, laser), or ultrasonic waves as detection waves. The front radar sensor 48 detects information indicating a relationship between the preceding vehicle and the own vehicle such as a relative speed of the preceding vehicle, a relative distance to the preceding vehicle, or a direction (horizontal position) of the preceding vehicle with respect to the own vehicle, where the information is detected in every certain period. The preceding vehicle information, acquired as described above, is sent to the information processing apparatus 10A in every certain period. Additionally, the function (for example, preceding vehicle's position calculation function) of the front radar sensor 48 may be achieved by the information processing apparatus 10A.

Additionally, an image sensor may be used instead of or in addition to the front radar sensor 48. The image sensor may be a camera or an image processing apparatus including imaging elements such as a CCD (charge-coupled device), or a CMOS (complementary metal oxide semiconductor), and performs image recognition of a state of the preceding vehicle. The camera of the image sensor may be a stereo camera. The image sensor detects, based on the image recognition result, information indicating the relationship between the preceding vehicle and the own vehicle such as information indicating a relative speed of the preceding vehicle, or a relative position with respect to the own vehicle in every certain period. The relative position information may include information related to the position (distance) of the preceding vehicle in a direction along the length of the own vehicle and information related to the position of the preceding vehicle in a direction (horizontal direction) along the width of the own vehicle. The preceding vehicle information, acquired by the image sensor as described above, may be sent to the information processing apparatus 10A at a frame cycle. Additionally, the image processing function (for example, preceding vehicle's position calculation function) of the image processing apparatus may be achieved by the information processing apparatus 10A.

Figure 7:
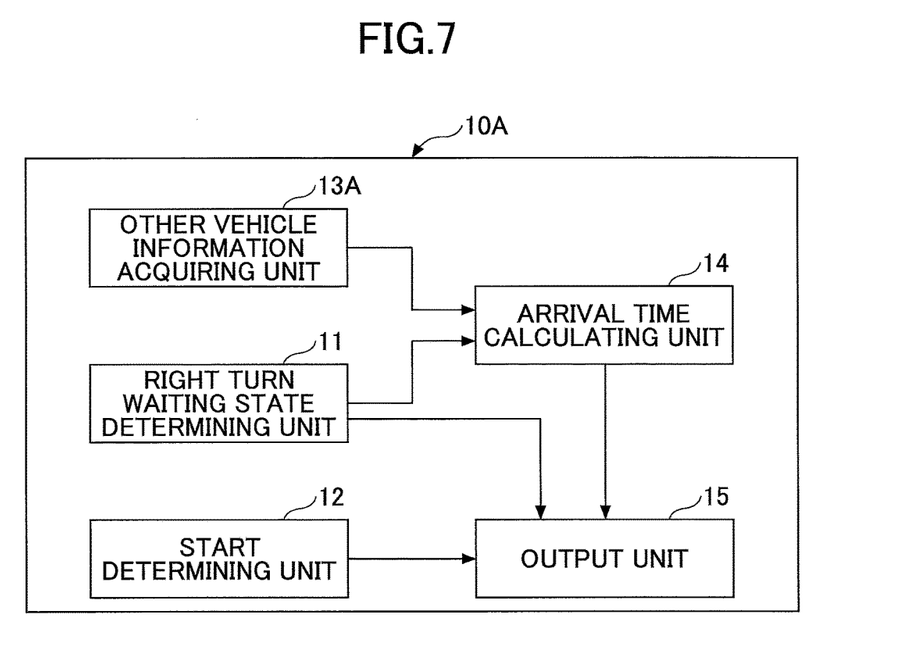
FIG. 7 is a block diagram for illustrating an example of the information processing apparatus.

FIG. 7 is a block diagram for illustrating an example of the information processing apparatus 10A. As for the information processing apparatus 10A, identical reference numerals will be applied to elements or the like shown in FIG. 7 that have substantially similar functions and configurations to those shown in FIG. 3, and descriptions thereof will be omitted.

The information processing apparatus 10A includes the right turn waiting state determining unit 11, the start determining unit 12, an other vehicle information acquiring unit 13A, the arrival time calculating unit 14 and the output unit 15.

The other vehicle information acquiring unit 13A acquires the preceding vehicle information (an example of other vehicle information) from the front radar sensor 48. Preferably, the other vehicle information acquiring unit 13A acquires the latest preceding vehicle information, unless communication failure, etc., occurs, since the preceding vehicle information is dynamically changed as described above. As described above, the preceding vehicle information includes information related to a state of the vehicle existing within a detection range of the front radar sensor 48.

The arrival time calculating unit 14 calculates time (arrival time ΔT1) taken for the oncoming vehicle existing within the detection range of the front radar sensor 48 to arrive at a position (reference position) corresponding to the front end of the own vehicle in a travelling direction of the oncoming vehicle, in real-time based on the preceding vehicle information acquired by the other vehicle information acquiring unit 13A. For example, the arrival time calculating unit 14 calculates TTC (Time to Collision) as the arrival time ΔT1. The arrival time calculating unit 14 may calculate the TTC referring to the preceding vehicle as the oncoming vehicle in a case where the position of the preceding vehicle in the horizontal direction based on the preceding vehicle information is detected to be in the opposite lane and the relative speed of the preceding vehicle based on the preceding vehicle information indicates that the preceding vehicle is coming closer to the own vehicle. Various calculation methods of the TTC are known in a field of pre-crash safety, and an arbitrary method may be chosen. For example, the TTC may be calculated by dividing the relative distance to the oncoming vehicle based on the preceding vehicle information by the relative speed of the oncoming vehicle based on the preceding vehicle information.

According to the embodiment 2, similarly to the embodiment 1, occurrence of unnecessary alarms can be reduced in starting the own vehicle having been waiting to make a right turn. As a consequence, likelihood for having the driver be irritated caused by the unnecessary alarm can be reduced. Additionally, according to the embodiment 2, the alarm can be similarly output in the embodiment 1 by using the front radar sensor 48 even if the object information cannot be acquired from the on-road monitoring apparatus 200.

In the following, the vehicle alarm output apparatus of the embodiment 3 will be described with reference to FIG. 8 to FIG. 10.

Figure 8:
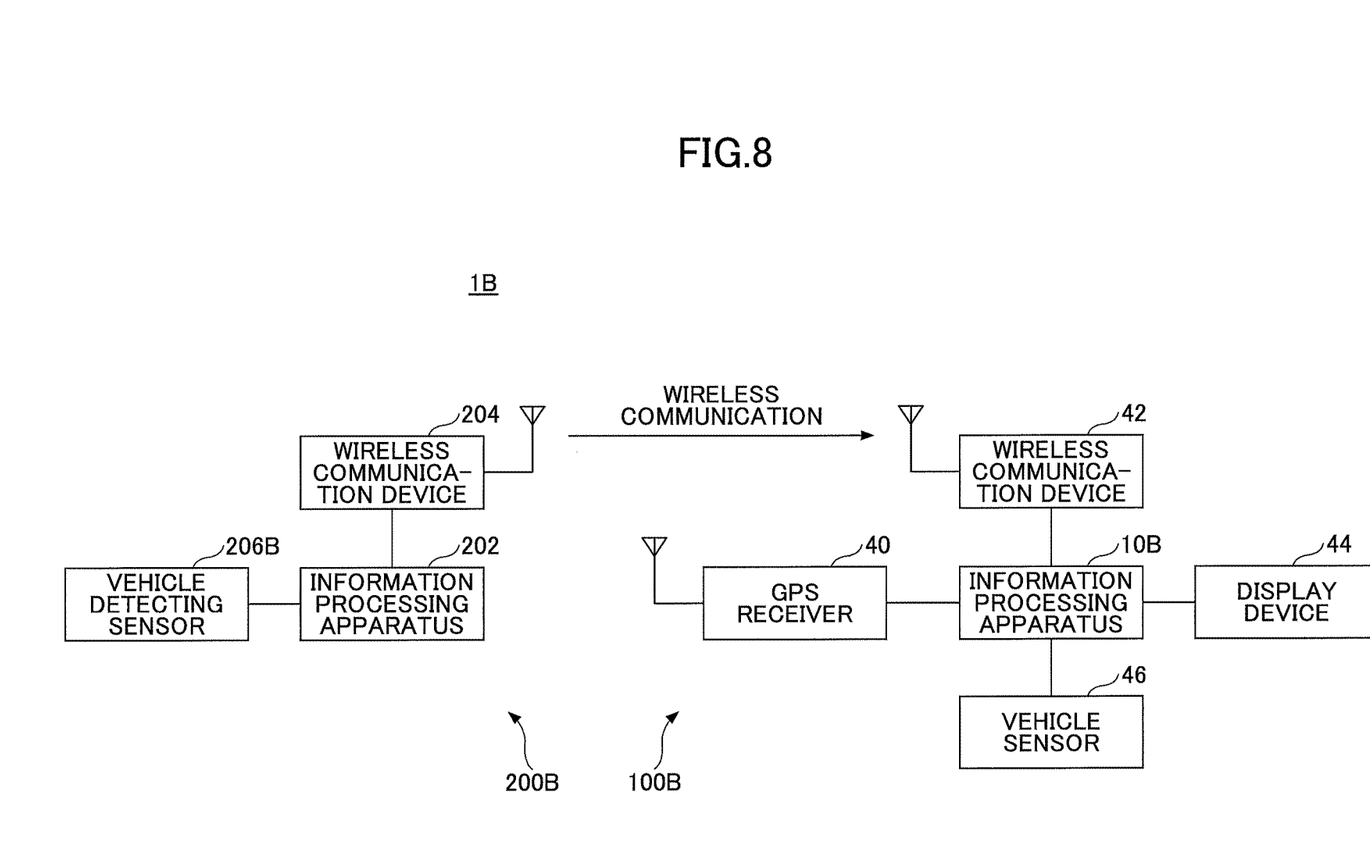
FIG. 8 is a block diagram for illustrating an example system configuration of a road-vehicle communication system 1B to which the vehicle alarm output apparatus of the embodiment 3 is applied.

FIG. 8 is a block diagram for illustrating an example system configuration of a road-vehicle communication system 1B to which the vehicle alarm output apparatus of the embodiment 3 is applied. Identical reference numerals will be applied to elements or the like shown in FIG. 1, which have substantially similar functions and configurations to those shown in FIG. 1, and descriptions thereof will be omitted.

The road-vehicle communication system 1B includes an onboard apparatus 100B and an on-road monitoring apparatus 200B.

The onboard apparatus 100B is installed in a vehicle. In the following, the vehicle in which the onboard apparatus 100B is installed is referred to as the "own vehicle".

The onboard apparatus 100B includes an information processing apparatus (an example of the vehicle alarm output apparatus) 10B, the GPS (Global Positioning System) receiver 40, the wireless communication device (an example of a receiving unit) 42, the display device 44 and the vehicle sensor 46.

The information processing apparatus 10B is formed with a computer. Respective functions (including functions described below) of the information processing apparatus 10B may be achieved by arbitrary hardware, software, firmware or a combination thereof. And the information processing apparatus 10B may be achieved by the plurality of the information processing apparatuses.

The on-road monitoring apparatus 200B includes the information processing apparatus 202, the wireless communication device 204 and a vehicle detecting sensor 206B. The on-road monitoring apparatus 200B is disposed in the intersection where the traffic signal is not installed.

The information processing apparatus 202 is formed with a computer. The information processing apparatus 202 generates object information based on the detection results of the vehicle detecting sensor 206B to provide them to the onboard apparatus 100B. The object information may be arbitrarily generated as long as it indicates the detection results of the vehicle detecting sensor 206B. The information processing apparatus 202 sends (broadcasts) the object information to the onboard apparatus 100B through the wireless communication device 204. For example, the information processing apparatus 202 sends the object information and periodically updates it since the object information is dynamically changed.

The information processing apparatus 202 may also generate information of the traffic signal in the intersection, the traffic regulation of the intersection and the road shape in the intersection, etc., (intersection information) and may send (broadcasts) the generated intersection information to the onboard apparatus 100B through the wireless communication device 204.

The vehicle detecting sensor 206B detects a state of a vehicle travelling toward the center of the intersection. The vehicle detecting sensor 206B has its detection area covering a priority road in the intersection. For example, the detection result of the vehicle detecting sensor 206B includes presence of a vehicle, and a position and a speed of the vehicle. The vehicle detecting sensor 206B may be a radar sensor, an image sensor, or the like.

Figure 9:
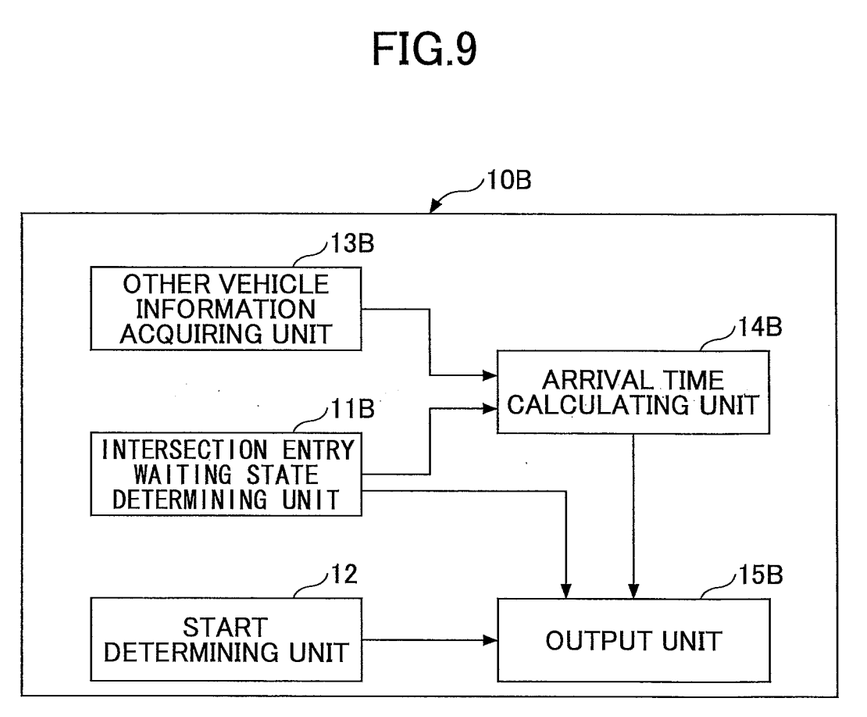
FIG. 9 is a block diagram for illustrating an example functional configuration of the information processing apparatus.

FIG. 9 is a block diagram for illustrating an example functional configuration of the information processing apparatus 10B. As for the information processing apparatus 10B, identical reference numerals will be applied to elements or the like shown in FIG. 9, which have substantially similar functions and configurations to those shown in FIG. 3, and descriptions thereof will be omitted. In the following, the vehicle travelling on a road crossing the traveling direction of the own vehicle is referred to as "crossing vehicle", while the road on which the crossing vehicle is travelling is referred to as "crossing road".

The information processing apparatus 10B includes an intersection entry waiting state determining unit (an example of waiting state determining unit) 11B, the start determining unit 12, an other vehicle information acquiring unit 13B, an arrival time calculating unit 14B and an output unit 15B.

The intersection entry waiting state determining unit 11B determine whether the own vehicle is in a waiting state (an example of waiting state) to enter into the intersection, staying in front of the intersection (intersection entry waiting state). The intersection entry waiting state determining unit 11B sets an entry waiting state flag to be "1" in a case where the own vehicle is determined to be in the intersection entry waiting state, while setting it to be "0" in other cases. The determination method may be arbitrarily chosen. For example, the intersection entry waiting state determining unit 11B may determine the own vehicle to be in the intersection entry waiting state when all of the following conditions (11)-(14) are satisfied.

(11) The position of the own vehicle approximately corresponds to a position (for example, a position of stop line) in front of the intersection without traffic signal.

(12) Neither a right blinker nor a left blinker is blinking.

(13) A brake pedal is operated.

(14) The own vehicle is stopped or travelling at a very low speed.

The other vehicle information acquiring unit 13B acquires the object information (an example of other vehicle information) from the on-road monitoring apparatus 200B through the wireless communication device 42. As described above, since the object information is dynamically changed, preferably, the other vehicle information acquiring unit 13B acquires (updates) the latest object information unless a communication failure, etc. occurs. Also, as described above, the object information includes information indicating the detection result of the vehicle detecting sensor 206B, that is, information indicating the state of the vehicle in the detection area.

The arrival time calculating unit 14B calculates time (arrival time ΔT1) to be taken for the crossing vehicle in the detection area to reach a position (reference position) corresponding to the front end of the own vehicle in the travelling direction of the crossing vehicle based on the object information acquired by the other vehicle information acquiring unit 13B. To be exact, the front end of the own vehicle in the travelling direction of the crossing vehicle in the detection area means the position at which a line extending along the length of the own vehicle (or direction along the lane in which the own vehicle is travelling) and a line extending along the travelling direction of the crossing vehicle (or direction along the crossing road) intersect each other. However, the reference position in the actual control may not be so exact. For example, it may be simply defined to be a position corresponding to the center line of the intersection or a position corresponding to an entrance point of the intersection. For example, the arrival time calculating unit 14B calculates the arrival time ΔT1 by dividing the distance (for example, distance between the center line of the intersection and the crossing vehicle) to the crossing vehicle based on the object information by a speed of the crossing vehicle based on the object information.

The output unit 15B outputs a certain alarm in a case where the intersection entry waiting state determining unit 11B determines the own vehicle to be in the intersection entry waiting state, the start determining unit 12 determines the own vehicle to start, and the arrival time calculating unit 14B calculates the arrival time ΔT1 to be equal to or less than a first threshold value Th1, while a prohibition condition is not met. The certain alarm is for calling the attention of the driver to the crossing vehicle.

The prohibition condition is met when the condition (f) described below is met.

Condition (f): the arrival time ΔT1 is less than a second threshold value Th2 which is less than the first threshold value Th1.

Figure 10:
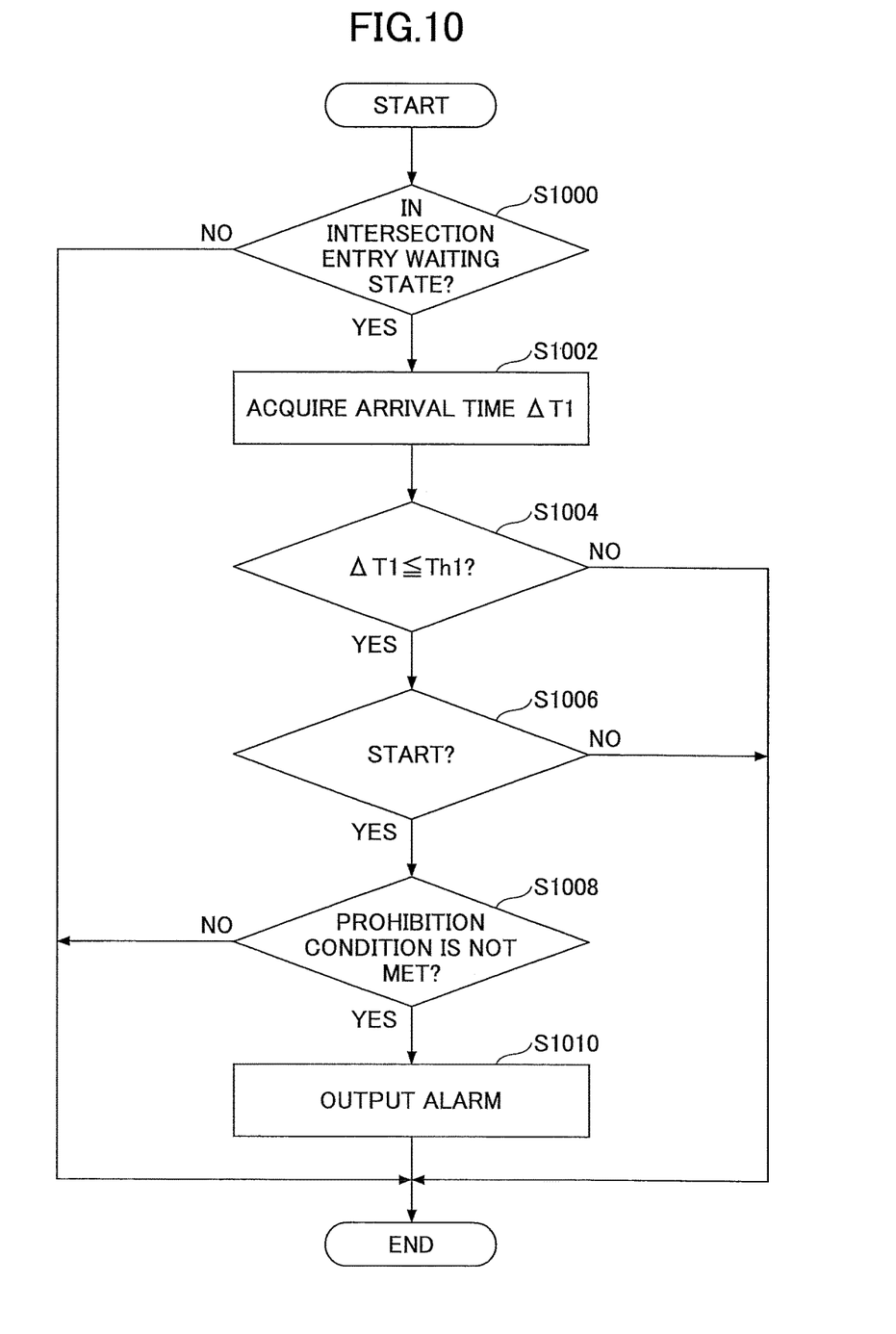
FIG. 10 is a flowchart for illustrating an example of an alarm output process performed by an output unit.

FIG. 10 is a flowchart for illustrating an example of an alarm output process performed by the output unit 15B.

The respective processes of step S1002-step S1010 shown in FIG. 10 are substantially the same as those of step S502-step S510 shown in FIG. 5. However, the respective values chosen for the first threshold value Th1 and the second threshold value Th2 may be changed. For example, the second threshold value Th2 is set to be less than a time (virtual collision point arrival time) taken for the own vehicle waiting for the entry into the intersection to reach at a position on the crossing road where collision with the crossing vehicle can occur.

In step S1002, the output unit 15B determines whether the own vehicle is determined to be in the intersection entry waiting state by the intersection entry waiting state determining unit 11B. Specifically, the output unit 15B determines whether the entry waiting state flag is "1". The process proceeds to step S1002 in a case where the entry waiting state flag is "1", while the process (in this cycle) ends in a case where the entry waiting state flag is not "1".

According to the process shown in FIG. 10, the output of the alarm is prohibited in a case where the arrival time ΔT1 is less than a second threshold value Th2. Thus, occurrence of unnecessary alarms can be reduced in starting the own vehicle having been waiting for the entry into the intersection. As a consequence, likelihood for having the driver be irritated caused by the unnecessary alarm can be reduced.

Additionally, in the example shown in FIG. 10, although the respective processes are performed in a certain sequence, the sequence of processes may be changed. For example, the determination of step S1008 may be performed before step S1006.

Herein above, although the invention has been described with respect to a specific embodiment, the appended claims are not to be thus limited. It should be understood that the various changes, substitutions, and alterations could be made hereto without departing from the spirit and scope of the claims. Further, all or part of the components of the embodiments described above can be combined.

For example, although the embodiment 2 has been described as an embodiment for reducing the unnecessary alarm in starting the own vehicle having been waiting to make a right turn (as described in the embodiment 1), it may be applied to a case for reducing the unnecessary alarm in starting the own vehicle having been waiting for the entry into the intersection (as described in the embodiment 3).

And, although, in the embodiment described above, the alarm is displayed, a voice alarm, a sound alarm, a vibration alarm, etc., may be output instead of or in addition to the displayed alarm. Further, the alarm may be achieved by increasing a reaction force of the accelerator pedal.

Although, in the embodiments described above, the descriptions are given assuming a left-hand traffic country, substantially the same control manner can be applied in a right-hand traffic country replacing the "right turn waiting state" with "left turn waiting state". That is, in the right-hand traffic country, the right turn waiting state is an example of waiting state where the own vehicle staying in the intersection is waiting for the oncoming vehicle to pass the intersection in order to make a left turn.

The present application is based on Japanese Priority Application No. 2014-210236, filed on Oct. 14, 2014, the entire contents of which are hereby incorporated by reference.

What is claimed is:

1. A vehicle alarm output apparatus configured to output an alarm at an intersection of roads, the alarm output apparatus comprising:
   a waiting state determining unit configured to determine whether an own vehicle is in a waiting state, wherein the waiting state is (i) a state where the own vehicle is within an intersection area including the intersection and is waiting for a timing to turn left or right to travel across an opposite lane, or (ii) a state before the own vehicle enters the intersection area;
   a start determining unit configured to determine whether the own vehicle is about to start to travel;
   an other vehicle information acquiring unit configured to acquire other vehicle information related to another vehicle, different from the own vehicle, travelling toward the intersection;
   an arrival time calculating unit configured to calculate, based on the other vehicle information acquired by the other vehicle information acquiring unit, a time taken for the another vehicle to reach a position corresponding to a front end of the own vehicle in a travelling direction of the another vehicle upon the waiting state determining unit determining the own vehicle to be in the waiting state; and
   an output unit configured to output a certain alarm upon the waiting state determining unit determining the own vehicle to be in the waiting state, the start determining unit determining the own vehicle to be about to start to travel, and the time calculated by the arrival time calculating unit to be equal to or less than a first threshold value; wherein
   the output unit is prevented from outputting the certain alarm upon detecting the time calculated by the arrival time calculating unit to be equal to or less than a second threshold value which is less than the first threshold value.

2. The vehicle alarm output apparatus as claimed in claim 1, further comprising:

a receiving unit configured to receive the other vehicle information from an on-road monitoring apparatus disposed in the intersection area; wherein
the other vehicle information acquiring unit acquires the other vehicle information through the receiving unit.

3. The vehicle alarm output apparatus as claimed in claim 1, wherein the another vehicle is an oncoming vehicle, and the own vehicle within the intersection area is waiting for the oncoming vehicle that travels in the opposite lane passing through the intersection area when the own vehicle is in the waiting state.

* * * * *